United States Patent [19]
Whitehead

[11] Patent Number: 5,168,183
[45] Date of Patent: Dec. 1, 1992

[54] LEVITATION SYSTEM WITH PERMANENT MAGNETS AND COILS

[75] Inventor: Lorne A. R. Whitehead, Vancouver, Canada

[73] Assignee: The University of British Columbia, Vancouver, Canada

[21] Appl. No.: 676,066

[22] Filed: Mar. 27, 1991

[51] Int. Cl.⁵ .................. H02K 41/00; H02K 7/09; H02K 13/08
[52] U.S. Cl. .................. 310/12; 310/90.5; 104/284
[58] Field of Search .............. 310/12, 90.5, 13, 14; 104/284

[56] References Cited

U.S. PATENT DOCUMENTS

| | | | |
|---|---|---|---|
| 2,323,837 | 7/1943 | Neal | 35/46 |
| 3,512,852 | 5/1970 | North | 308/10 |
| 3,638,093 | 1/1972 | Ross | 318/687 |
| 3,815,963 | 6/1974 | Wilk | 308/10 |
| 3,888,553 | 6/1975 | Wehde | 308/10 |
| 4,040,681 | 8/1977 | van der Heide | 308/10 |
| 4,356,772 | 11/1982 | van der Heide | 104/282 |
| 4,382,245 | 5/1983 | Harrigan | 335/306 |
| 4,585,282 | 4/1986 | Bosley | 308/10 |
| 4,761,579 | 8/1988 | Delassus | 310/90.5 |
| 4,870,310 | 9/1989 | Triplett | 310/74 |
| 4,874,346 | 10/1989 | Wachspress | 446/484 |
| 4,910,633 | 3/1990 | Quinn | 361/144 |
| 4,975,669 | 12/1990 | Wojtowicz | 335/216 |
| 5,009,111 | 4/1991 | West et al. | 73/862.61 |

Primary Examiner—Steven L. Stephan
Assistant Examiner—D. R. Haszko
Attorney, Agent, or Firm—C. A. Rowley

[57] ABSTRACT

A levitation system for levitating a levitated magnetic element in a stable suspended position on one side of a separating plane using a magnetic arrangement on the opposite side of the separating plane. The magnetic arrangement provides a preselected static magnetic field configuration that interacts with a magnet in the levitated element so that the magnetic potential energy of this interaction increases for displacements of the element from its stable position in directions parallel to a stability plane and decreases for displacements of the element from the stable position perpendicular to the stability plane. Any movement perpendicular to the stability plane is sensed and used by a feedback control system to control a force applied to the levitated element to stabilize the element against displacement from the stable position in directions perpendicular to the stability plane.

29 Claims, 6 Drawing Sheets

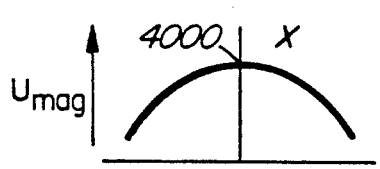 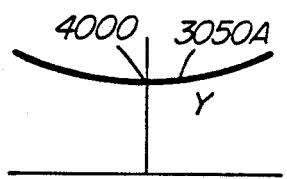 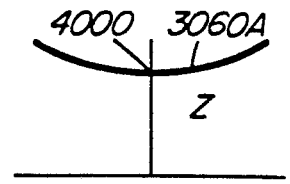
FIG. 2a     FIG. 2b     FIG. 2c
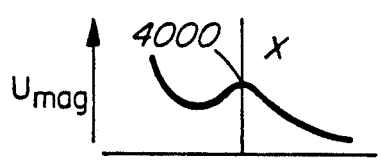 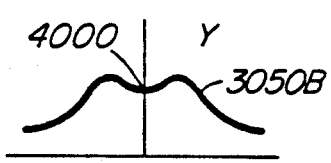 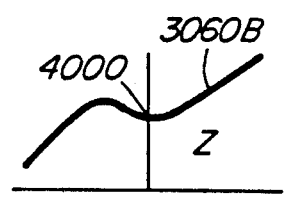
FIG. 3a     FIG. 3b     FIG. 3c
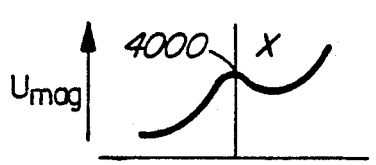 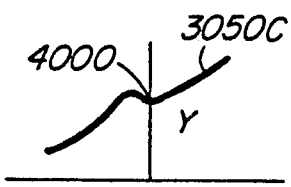 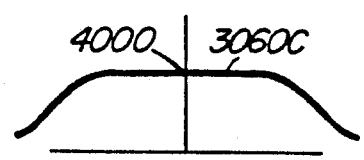
FIG. 4a     FIG. 4b     FIG. 4c

LEVITATION SYSTEM WITH PERMANENT MAGNETS AND COILS

FIELD OF THE INVENTION

The present invention relates to a levitation system. More particularly the present invention relates to a levitation system for holding a levitated magnetic element in stable levitated position on one side of a plane with the levitation device on the opposite side of the plane.

BACKGROUND OF THE PRESENT INVENTION

No effective system has been devised for maintaining a magnetic element at an equitable position by means of a magnetic field produced by any magnets positioned on one side of a plane, with the levitated element on the opposite side thereof and wherein external forces (e.g. gravity) tending to move the levitated element away from the levitating system are not essential for the equilibrium to exist.

Previous methods for low cost, stable magnetic levitation apply electromagnets mounted above the levitated magnetic element which is subjected to gravity. This configuration is able to provide stability in five degrees of freedom without a feedback control, and a simple feedback control is all that is required to stabilize the element in its vertical position. This system is not effective where an external force, e.g. gravity is not tending to move the element away from the electromagnets.

U.S. Pat. No. 2,323,837 issued Jul. 6, 1943 to Neal describes an attempt at levitating a magnetic element from below. In this arrangement a plurality of magnets are arranged in a circle and the levitated magnetic element is positioned within the circle with like poles of the circular and levitated magnets facing each other. This system has not proved satisfactory, as it is well established that such a system is inherently unstable.

U.S. Pat. No. 3,638,093 issued Jan. 25, 1972 to Ross describes a levitation system that functions also as a linear electromagnetic electric motor which supports the driven element above a track.

U.S. Pat. No. 4,585,282 issued Apr. 29, 1986 to Bosley shows a system for levitating a magnetic element from above with various feedback controls that may be employed to ensure stability of the levitated element. This patent also describes a possible technique for levitating an element and maintaining it in a stable position by means of levitating magnets positioned below a plane. This system has not proven satisfactory, possibly because the levitated object is unstable in two degrees of freedom, which makes feedback control for stabilization difficult.

BRIEF DESCRIPTION OF THE PRESENT INVENTION

It is an object of the present invention to provide a device for stable magnetic levitation of a magnetic object on one side of a plane by a magnetic levitation device on the opposite side of the plane permitting the use of simple, low cost components.

Broadly the present invention relates to a levitating system comprising a levitating device positioned on one side of a separating plane for maintaining a levitated element at a substantially stable position on the side of said separating plane remote from said one side and wherein said element includes magnetic means defining a magnetic region, and said device comprises a static magnet means producing a preselected static magnetic field configuration such that said element is levitated by said magnetic field configuration interacting with said magnetic region to cause the magnetic potential energy of said interaction to increase for substantially all displacements of said element from said stable position in directions parallel to a preselected stability plane and said magnetic potential energy to decrease for any displacement of said element from said stable position in a direction perpendicular to said stability plane, a sensor means generating a signal dependent on displacement of said element in said direction perpendicular to said stability plane, a controllable force means and a feedback control means, said feedback control means receiving said signal from said sensing means and controlling said controllable force means to stabilize said element against displacement from said stable position in said direction perpendicular to said stability plane.

Preferably said static magnetic means will comprise a first magnetic means which stabilizes said levitated element against displacement from said stable position parallel to a first direction within said stability plane and a second magnetic means which stabilizes said element against displacements parallel to a second direction within said stability plane and wherein said second direction is substantially perpendicular to said first direction.

Preferably said magnetic means forming said magnetic region will be formed by at least one magnet having a polarization substantially parallel to a preselected magnetic direction and wherein said magnetic region has a maximum dimension which is significantly less than the minimum distance between said magnets of said levitating device and said static magnetic means.

Preferably said stability plane will be substantially parallel to the direction from the center of the magnetic region to the center of the static magnetic means.

Preferably said first magnetic means and said magnetic element will have their opposite magnetic poles closest to each other.

Preferably said first magnetic means will comprise a pair of spaced bar magnets with their poles facing parallel to the direction from the center of said pair of magnets toward the center of the magnetic region.

Preferably said second magnetic means will comprise a second pair of spaced bar magnets with poles facing in substantially the opposite direction as the poles of said first magnetic means.

Preferably said controllable magnetic means will comprise an electromagnet formed by two coil sections arranged with a gap therebetween, said gap being symmetrically positioned relative to said stability plane, said gap providing a leakage magnetic field, said leakage magnetic field from said gap having a polarity opposite to the polarity of the magnetic field generated by said coils in the region surrounding said electromagnet and wherein said leakage field and said surrounding field substantially cancel each other at said stable point of suspension.

Preferably said sensor means will comprise a Hall effect sensor sensing said movement of said element in said direction perpendicular to said stability plane.

BRIEF DESCRIPTION OF THE DRAWINGS

Further features, objects, and advantages will be evident from the following detailed description of the preferred embodiments of the present invention taken in conjunction with the accompanying drawings in which:

FIGS. 2a-c, 3a-c and 4a-c provide three independent examples of graphs of $U_{mag}$ (magnetic potential energy) of the interaction of the magnetic region of the levitated element with the magnetic field from the static magnetic means versus displacement in a direction perpendicular to the stability plane, (a), or in mutually perpendicular directions parallel to the stability plane, (b), and (c).

DESCRIPTION OF THE PREFERRED EMBODIMENTS

Figure 1:
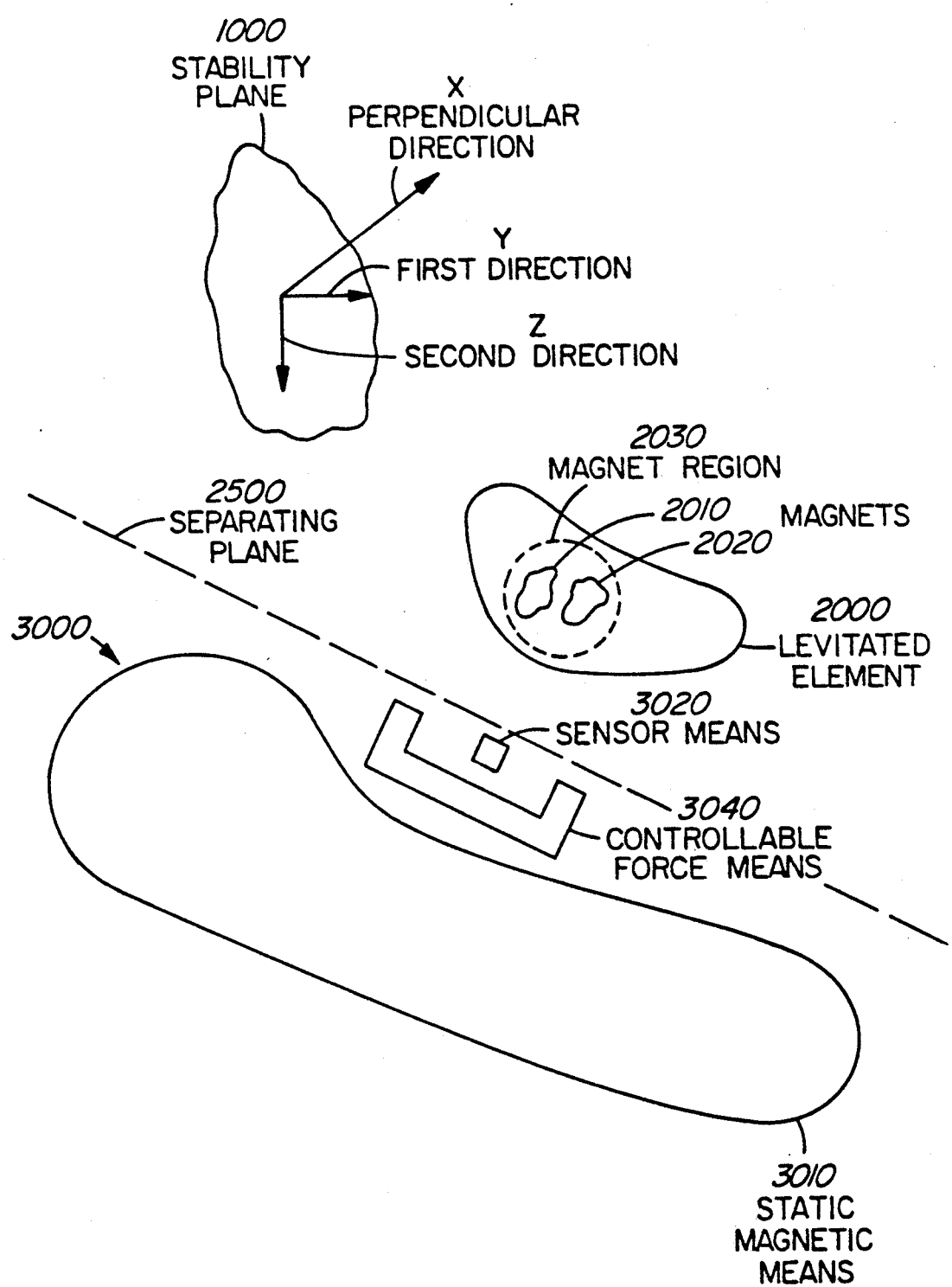
FIG. 1 is a schematic illustration of the general concept of the present invention.

Unlike most other large gap magnetic levitation devices the force of gravity is not a key part of the operation of the present invention but is simply an example of an external force which may perturb the levitated element from a stable position by a small distance. In principle the device of the present invention may be turned to any angle relative to gravity and the levitated element will stay in a stable position relative to the levitating device, provided the device is constructed with sufficient stability in all directions.

Obviously in most instances with the notable exception of a free fall condition in outer space, gravity will play a role and the strength of the stability has to be strong enough to resist gravity. For any geometrical design, this will be true at a certain size or scale since the smaller the size the stronger the magnetic stability forces will be compared to gravity. The characteristics of a good design constructed in accordance with the present invention will be its capability to withstand gravity at comparatively large size scale, that it would require only comparatively small amount of magnetic material, and that it be comparatively easy to manufacture.

The levitated element may change orientation somewhat when displaced so that not every point moves the same amount in the same direction but nevertheless the element will remain stable relative to the magnetic levitating device.

In order to describe the motion of the element, it is therefore important to define an effective magnetic center as a reference point to define such displacement. This can be done as follows.

The magnetic dipole density distribution of the magnets in the levitated element, which define the magnetic region of the levitated element, may be described when the element is at the stable position and orientation, by a magnetic dipole moment density $D(x,y,z)$ where x,y and z are the coordinates relative to an arbitrary set of mutually perpendicular axes. Using this definition, the magnetic center of the levitated element is designated to be at the $x_0$, $y_0$, $z_0$ point given by the formula $$x_o = \frac{\int dxdydzxD^2(x,y,z)}{\int dxdydzD^2(x,y,z)}$$

$$y_o = \frac{\int dxdydzyD^2(x,y,z)}{\int dxdydzD^2(x,y,z)}$$

$$z_o = \frac{\int dxdydzzD^2(x,y,z)}{\int dxdydzD^2(x,y,z)}$$

and the point $(x_0, y_0, z_0)$ is the equilibrium position for the element. If the element is displacement from the equilibrium position, the magnetic center, as defined above, will move to new coordinates $(x_{mc}, y_{mc}, z_{mc})$, and the displacement of the element can be uniquely described by the vector $(x_{mc}-x_0, y_{mc}-y_0, z_{mc}-z_0)$.

In any new position $x_{mc}, y_{mc}, z_{mc}$ for the effective magnetic center there will be a stable orientation of the levitated element which may not be exactly the same as for the original position of the effective magnetic center. For the new position there will be a new, different magnetic dipole density distribution $$\bar{D}(x_{mc}, y_{mc}, z_{mc}, x,y,z) \tag{2}$$

Additionally, the static magnetic potential energy $U_{mag}$ for this particular position for the levitated element is given by $$U_{mag}(x_{mc}, y_{mc}, z_{mc}) = -\int dxdydz\bar{D}(x_{mc}, y_{mc}, z_{mc}, x,y,z)\cdot\bar{B}_s(x,y,z) + C \tag{3}$$

where $B_s(x,y,z)$=static magnetic field, and C is an arbitrary constant. Magnetic potential energy, like any potential energy, provides a measure of stability or instability about an equilibrium point and more specifically the force F at any point is given by $$\bar{F}(x_{mc}, y_{mc}, z_{mc}) = -\nabla U_{mag}(x_{mc}, y_{mc}, z_{mc})$$

i.e. the force is toward the place or location of lower potential energy and the faster the potential energy changes with position the greater the force. Because of this relationship, it is helpful to describe the nature of equilibria by the manner in which $U_{mag}$ varies spatially in the region around the equilibrium point.

Although the above description is sufficient for understanding the technical terms of this invention, it may help to put this invention in context to consider in more detail the implications of physical laws of magnetic fields with regard to levitation systems. In that regard, what follows is a brief summary of the scientific background of this invention.

In practical magnetic levitation systems of the types considered here, the levitated object may include one small magnetic dipole, or an array of such magnetic dipoles rigidly connected to one another. The mathematical description of the possible effects of permanent magnetic fields near an equilibrium point (i.e. a stable position 4000 and orientation for the levitated object for which there is no net force or torque), will be treated first for the case of the single point dipole, and then generalized to the multiple-dipole.

A levitated dipole has six degrees of freedom-three of position and three of orientation. However, the treatment can be simplified by assuming that at equilibrium, the levitated dipole, having magnetic dipole moment $\bar{D}$, is parallel to the magnetic field, i.e.

$$\bar{D} \times \bar{B} = 0 \qquad (4)$$

because this is the orientation of minimum potential energy. If $\bar{B}_s(x,y,z)$ represents the magnetic field from the static magnetic means as a function of position, then (4) implies that the magnetic potential energy of the point dipole, as a function of position is given by $$U_{mag}(x,y,z) = -DB(x,y,z) + C \qquad (5)$$

where C is an arbitrary constant. With no loss of generality, we will assume that at the equilibrium point, $x = y = z = 0$.

In considering matters of stable and unstable equilibria, it is appropriate to expand the magnetic potential energy function $U_{mag}(x,y,z)$ into 0th, 1st, and 2nd order terms of displacement about the equilibrium point (i.e. terms in 0th power, 1st power, and 2nd power in the spatial variables x,y, and z). The 0th order term represents the potential energy at the equilibrium point, the first order terms correspond to magnetic forces at the equilibrium point (which can be used to counteract externally applied forces such as gravity, to create the equilibrium condition) and the second order terms correspond to stabilizing/destabilizing forces which are zero at the equilibrium point, but increase in proportion to the displacement from the equilibrium position.

The range of possible permanent magnetic fields is restricted by the Maxwell Equations, which in free space and at steady state imply the condition that $$\nabla \times \bar{B} = 0 \text{ and } \nabla \cdot \bar{B} = 0 \qquad (6)$$

This condition, coupled with the definition of $U_{mag}$ in (5) above, significantly restricts the allowable second order terms in the expansion of $U_{mag}$ about the equilibrium point. In particular, a term of the form $$U_{mag} = K(x^2 + y^2 + z^2)$$

where K is a positive constant, which would correspond to a field which is stabilizing (i.e. providing a restoring force toward equilibrium) in all three dimensions, is not possible. This is why stable equilibrium in a static field alone is not possible. On the other hand, equation (6) places no restriction on the 0th and 1st order terms.

The following equation represents the most general 2nd order expansion of $U_{mag}(x,y,z)$, subject to (6):

$$U_{mag}(x, y, z) = U_o + (G_x)x + (G_y)y + (G_z)z + (P_{xy})xy + \qquad (7)$$

$$(P_{xz})xz + (P_{yz})yz + (S_{xy})[x^2 - y^2] + (S_{xz})[x^2 - z^2] +$$

$$(S_{yz})[y^2 - z^2]$$

The constants Gx, Gy and Gz (gradient coefficients) represent magnetic force in the x,y,z directions, and the second order coefficients Pxy, Pxz, Pyz, ("product") and Sxy, Sxz, Syz ("square") represent stabilizing forces in some directions, but destabilizing forces in other directions. (It should be noted, that the last term, with coefficient Syz, is not really necessary, as this term can be duplicated by a positive value for Sxz and the opposite value for Sxy. While the term is not necessary, it is kept in as it simplifies the terminology in this Cartesian coordinate depiction).

Although the situation is more complex for the multiple dipole case, a generalization to this case is possible, with very simple results. Since in this case the levitated object has a substantial physical extent, it is simplest to let the coordinates x, y, z refer to the location of the effective magnetic center of the levitated object, as defined in 1. Again, it is assumed that we are interested in the situation in the immediate vicinity of an equilibrium point, and that the orientation of the object, for any given location x, y, z will be that of minimum potential energy. With these generalizations, the function $U_{mag}(x,y,z)$ is completely determined for any given magnetic field, but its functional form will be much more complex than that of (5), because it will depend on the strengths, relative positions, and relative orientations of the various component dipoles.

Fortunately, despite the complexity in the functional dependence of $U_{mag}(x,y,z)$ on $\bar{B}(x,y,z)$, the net effect of restriction (6) is precisely the same as the point dipole case, namely that the most general second-order expansion about the equilibrium position is given by (7).

The main difference between the two cases arises in the design of specific magnetic fields required to achieve specific values for the coefficients in (7). In the point dipole case, the fields themselves can be very simply determined, by means of equation (5) whereas the situation is understandably more complex in the multiple dipole case.

Given that the allowable second order terms cannot provide overall stability, it is clear that stability can only be achieved by sensing the position of the levitated object, and adjusting the first order (gradient) terms in response, so as to actively direct the object back toward the desired equilibrium position. Indeed, since the second order terms are all destabilizing in some directions, it might seem preferable to design a magnetic field resulting in just 0th and 1st order terms—something which is readily achievable with well known magnet designs.

As a practical manner, such an approach would be exceedingly difficult. The reason for this is that such feedback control would require sensing and reacting to three dimensional degrees of freedom, for which the resulting responses will not be generally independent. Particularly because a levitated object has very little natural damping, and because the inductive nature of electromagnets introduces phase lags in their response to control signals, achieving stability for such a complex control system will be very difficult and expensive. Indeed, achieving good stability with even one channel of active control is often difficult with magnetic levitation.

The reason that the second order terms in (7) are in fact useful is that they allow the creation of a permanent field in which the levitated object is stable in two of the three physical dimensions, and unstable in only one, thus tremendously simplifying the active control requirements as described above. Three examples of coefficients for second order terms which achieve this effect are:

| Example | $P_{xy}$ | $P_{xz}$ | $P_{yz}$ | $S_{xy}$ | $S_{xz}$ | $S_{yz}$ | NOTE |
|---|---|---|---|---|---|---|---|
| 1 | 0 | 0 | 0 | −1 | −1 | 0 | unstable in x direction |
| 2 | 0 | 0 | 0 | 1 | 0 | −1 | unstable in y direction |
| 3 | 0 | 0 | 0 | 0 | 1 | 1 | unstable in z direction |

Thus is can be seen that from a scientific viewpoint, it is possible to create a static magnetic field yielding an equilibrium condition which is stable in two directions defining a plane of stability, and unstable in only the direction perpendicular to the plane of stability. Taken in this context, the invention described herein provides a system employing such a stability type, wherein the required field is created by a static magnetic means positioned entirely on the side of a reference plane opposite the location of the equilibrium point itself. All of this will be made clearer in the following detailed description of the drawings.

DETAILED DESCRIPTION OF DRAWINGS

Referring to FIG. 1 which provides the most general illustration of the present invention, a stability plane 1000 has been shown in space and a preselected first direction and its respective direction perpendicular thereto designated as a second direction have been indicated by the letters y and z. The direction perpendicular to the stability plane has been labelled the perpendicular direction x.

The levitated element has been schematically depicted at 2000 and includes generally permanent magnets 2010 and 2020 (two have been shown but more or fewer magnets may be used to define a magnetic region 2030).

On the opposite side of separation plane 2500 is levitating device 3,000 provided by a static magnetic means 3010, a sensor 3020 and a controllable force generating means 3040.

Generally the static magnetic device 3000 will generate a magnetic field configuration that interacts with the magnets 2010 and 2020 of the levitated element 2000 so that movement of the magnetic region 2030 parallel to the stability plane 1000, i.e. in the y and z directions as depicted by graphs (b) and (c) will result in increased magnetic potential energy $U_{mag}$ as shown by the curves 3050A, 3050B, 3050C, 3060A, 3060B and 3060C in FIGS. 2, 3 and 4 which show the potential energy increasing on opposite sides of the stability position 4000 for the y and z mutually perpendicular directions.

Graphs (a) of FIGS. 2, 3 and 4 show the instability in the x direction wherein the magnetic potential energy decreases with any movement in the x direction regardless of direction i.e. away from the stability position 4000 in directions perpendicular to the stability plane 1000.

It will be evident that to generate this type of magnetic configuration, having its potential energy increase with movement in two substantially perpendicular directions parallel to a stability plane and decrease in movements perpendicular to the stability plane, it is possible to use a large variety of different static magnetic means which can be designed by employing the well known laws of magnetic fields.

The following provides several examples of magnetic devices suitable for carrying out the present invention.

In the illustrated arrangement shown in FIG. 5 the levitated element 10 is positioned on the z axis at a stable point or position of suspension 12 (i.e. position 4000 described above) on the z axis and is held at this point against relative movement in the x direction parallel to the x axis or in the y direction parallel to the y axis or in the z direction parallel to the z axis as will be described more fully hereinbelow. The y and z axes define the stability plane y, z which has been illustrated as a vertical plane with the z axis vertical. The x and y axes are mutually perpendicular to the z axis.

Figure 5:
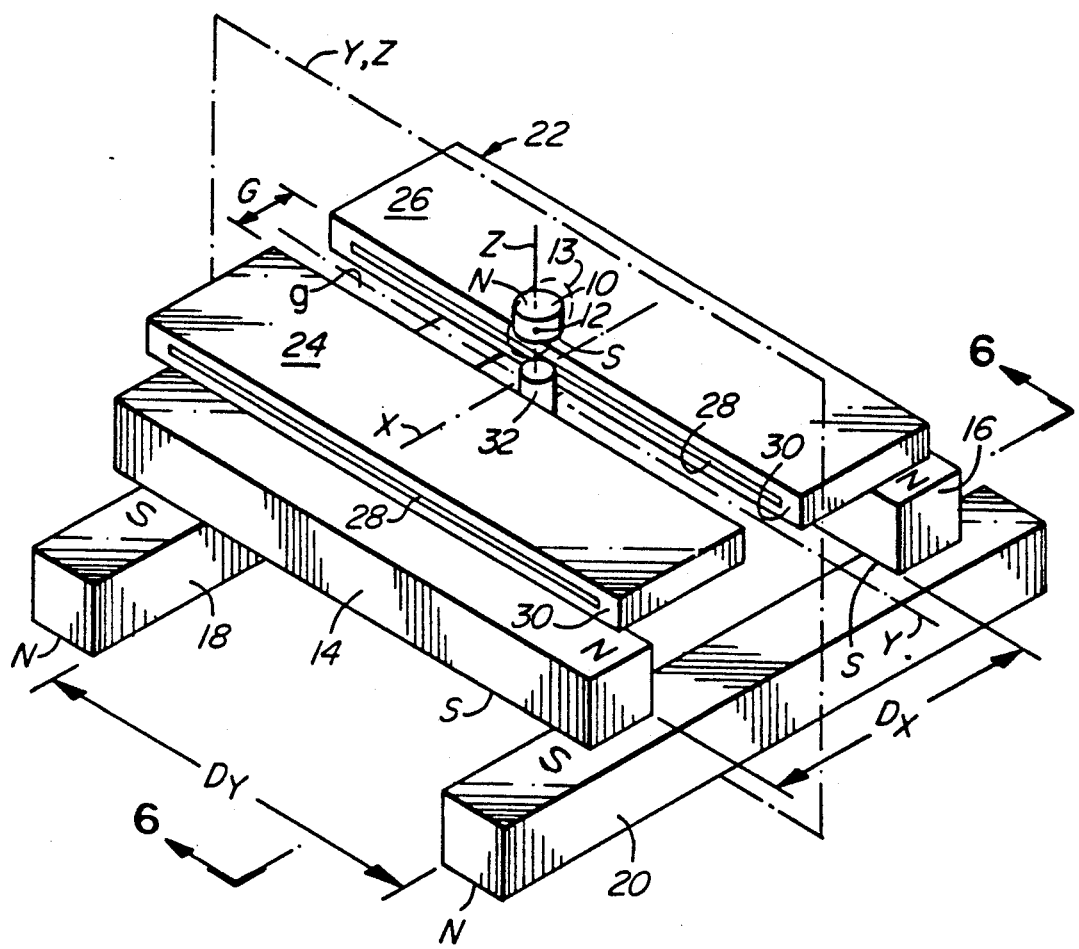
FIG. 5 is an isometric view of one form of the present invention showing the operating elements.

The first magnetic means in the arrangement illustrated in FIG. 5 is composed of a first pair of bar magnets 14 and 16 which have been positioned substantially parallel to the y axis and spaced on opposite sides of the stability plane y,z extending as above indicated in the y and z directions and indicated by dot dash lines in FIG. 5 i.e. spaced in the x direction and symmetric relative to the stabilization plane y,z. In this case the two magnets 14 and 16 are essentially the same and have essentially the same strength. The spacing $D_x$ between the magnets 14 and 16 is bisected by the plane y,z. The length of these magnets 14 and 16 in the y direction and their extension on opposite sides of the stabilization point 12 are sufficiently to appear almost infinitely long relative to the magnetic region schematically indicated by the dash line 13 around the element 10. The element 10 is suspended with the magnetic center of the magnetic region 13 of the element 10 substantially positioned at the stable suspension point 12.

The polarity of the magnets 14 and 16 is arranged so that the magnetic poles of the magnets face in the z direction. In the illustrated arrangement the north pole has been directed upward, the south pole downward as indicated by the letters N and S on these magnets 14 and 16.

The levitated magnetic element 10 has its magnetic poles also arranged facing in the z directions but is positioned with its magnetic poles arranged in opposition to those of magnets 14 and 16 so that in the illustrated arrangement the upwardly facing pole is a north pole (N) and a downwardly facing pole is a south pole (S), i.e. opposite poles are closer to each other between the magnetic element 10 and the magnets 14 and 16 of the first magnetic means.

These magnets 14 and 16 stabilize the element from movement in the z direction, while providing a destabilizing effect in the x direction, and a neutral effect in the y direction.

The second magnetic means is formed by a second pair of bar magnets 18 and 20 which in the illustrated arrangement are positioned below the magnets 14 and 16, i.e. spaced farther in the z direction from the point 12 than the magnets 14 and 16. These magnets 18 and 20 have their longitudinal axis substantially parallel to the x axis, i.e. substantially perpendicular to the axis of the magnets 14 and 16 and are arranged with their magnetic poles facing in the z direction but inverted relative to magnets 14, 16 and 10 so that in illustrated arrangement the south poles (S) of the magnets 18 and 20 face vertically upward and the north poles (N) downward.

The spacing between the two magnets 18 and 20 has been indicated by the distance $D_y$ and assuming that the magnets 18 and 20 are of the same strength they will also be positioned symmetrical relative to the axis z, i.e.

will be equally spaced from the vertical axis z on which the point 12 is located.

These magnets 18 and 20 stabilize the element 10 from movement in the y direction while providing a destabilizing effect in the z direction, and a neutral effect in the x direction. It is therefore important that the magnetic forces applied to the element 10 by the magnets 18 and 20 be significantly less than the forces applied by the magnets 14 and 16 of the first magnetic means, so that stability in the z direction is not lost.

Thus the first and second magnet means formed by the magnets 14 and 16 and 18 and 20 respectively stabilize the element 10 from movement in the plane y, z while creating a destabilizing effect in the x direction.

Movement in the x direction must be overcome by a feedback control. In the illustrated arrangement the controllable force means is a controllable magnet formed by a split coil 22 having a first coil section 24 and second coil section 26, axially spaced to form a gap g therebetween, the gap having a substantially constant width G measured in the x direction, the gap g being centered on and parallel to the plane y, z in which the point 12 is located.

The coil sections 24 and 26 are each formed by a core 28 with windings in series and wound there around in the same direction, the windings being contained in the coil section 30 surrounding each of the cores 28 as will be described hereinbelow.

Figure 9:
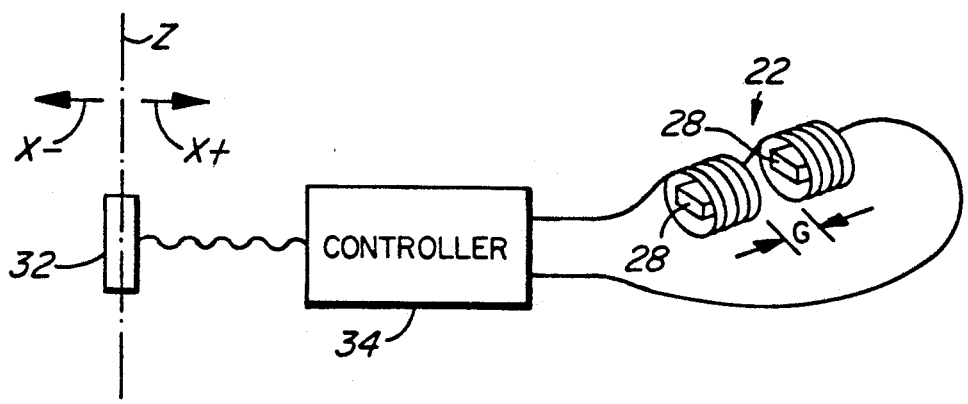
FIG. 9 is a schematic illustration of the control system for the electromagnet.

A suitable sensor which may for example take the form of a Hall effect sensor provided, as indicated at 32 positioned on the z axis in which the point 12 is located, is adapted to sense any movement of the element 10 in the x direction. The sensor 32 sends a signal to a feedback control controlling the split coil 22 to maintain the element 10 properly positioned relative to the locating plane y, z. The sensor 32 sends a signal to the controller 34 which may be positioned in any convenient location (see FIG. 9) if the element 10 moves in either of the two opposite x directions and the controller 34 directs electrical current to the split coil electromagnet 22 to apply a magnetic force to the element 10 to move the element 10 back into the plane y, z if for some reason the element should tend to move therefrom. Care must be taken in designing the controller to ensure that oscillations about the equilibrium are damped rather than increasing exponentially using a variety of techniques well known in the art of magnetic levitation and servo control design.

Figure 6:
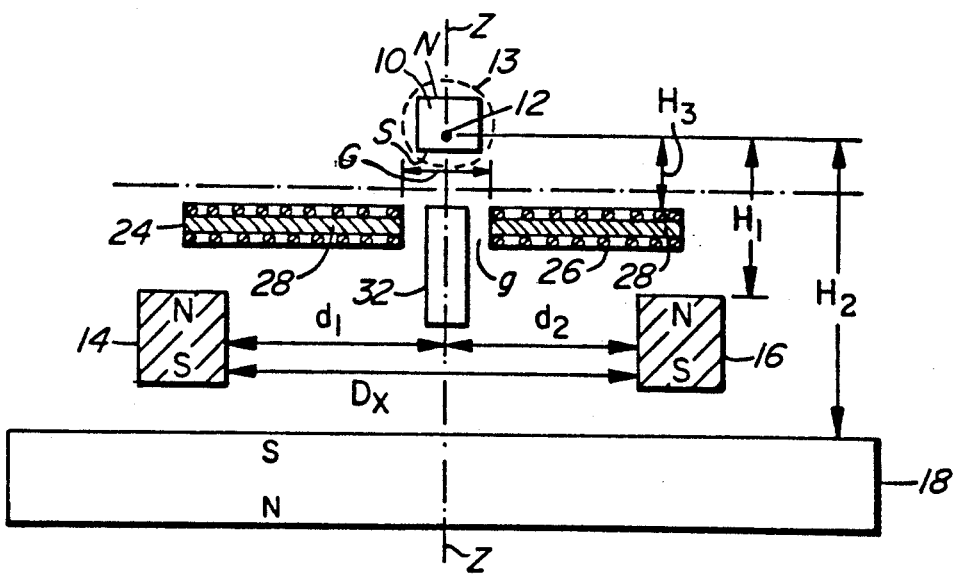
FIG. 6 is a section along the line 6—6 (x axis) of FIG. 5.
Figure 7:
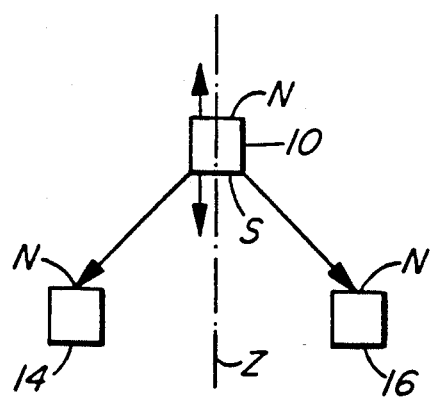
FIG. 7 is a schematic illustration of the levitation system of the present invention for maintaining a substantially constant spacing in the z direction.

The heights $H_1$, $H_2$ and $H_3$ as illustrated in FIG. 6 are respectively, the heights measured in the z direction from the stabilized point 12 to the magnets 14 and 16; to the magnets 18 and 20; and to the coil magnet 22.

In building the device preferably the two bar magnets 14 and 16 will be substantially identical. The spacing $D_x$ will be such that with no other magnets in position the height $H_1$ will be a maximum. This can be accomplished by, for example, placing the magnetic element 10 to be levitated within a tube so that there can be no movement in the x or y direction, but permitting substantially free movement in the z direction and gradually separating the magnets 14 and 16 to find the spacing $D_x$ that will result in a maximum for height $H_1$. The magnets 14 and 16 are then mounted and the spacing of the location of the point 12 in the z direction is determined.

The element 10 must be stabilized in the y direction without significantly changing the position of the point 12 in the z direction. This is accomplished by positioning the magnets 18 and 20 at a selected spacing $D_y$ and at a height from the point 12 $H_2$ wherein stabilization in the y direction is obtained and the spacing $H_1$ is not disturbed. The spacing $D_y$ and $H_2$ will vary depending on the strengths of the magnets 18 and 20. In the illustrated arrangement the magnets 18 and 20 are essentially the same strength as the magnets 14 and 16 and $H_2 \cong 2H_1$ has been found satisfactory for a spacing $D_y \cong 2D_x$.

Figure 8:
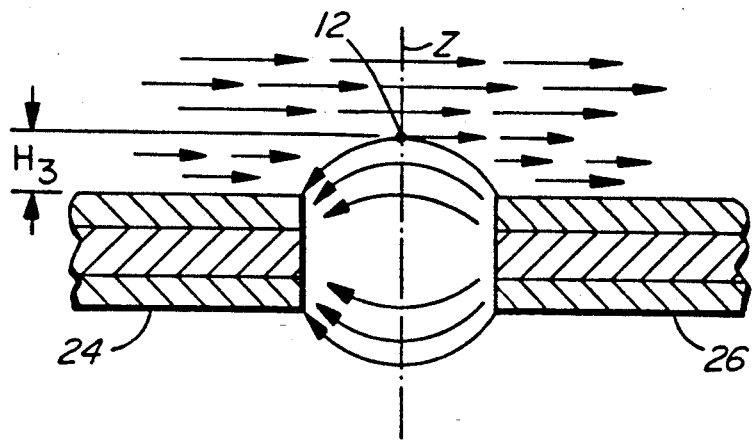
FIG. 8 is a schematic representation of the x direction control electro magnet.

The height $H_3$ is determined, as shown in FIG. 8, to be the height above the top surfaces of coils 24 and 26 at which the leakage flux from the gap G cancels the surrounding field from these coils. At this point, the only effect of the field configuration from these coils on magnet 10 will be a force in the x direction proportional to the current flowing in these coils.

The above example has dealt with substantially straight magnetic elements forming a first and second magnetic means generating in conjunction with the element 10 the required magnetic potential energy distribution to stabilize the element 10 in the y,z stabilization plane, and the use of a controlled leakage magnetic field to stabilize the element against movement out of the plane y,z.

Figure 10:
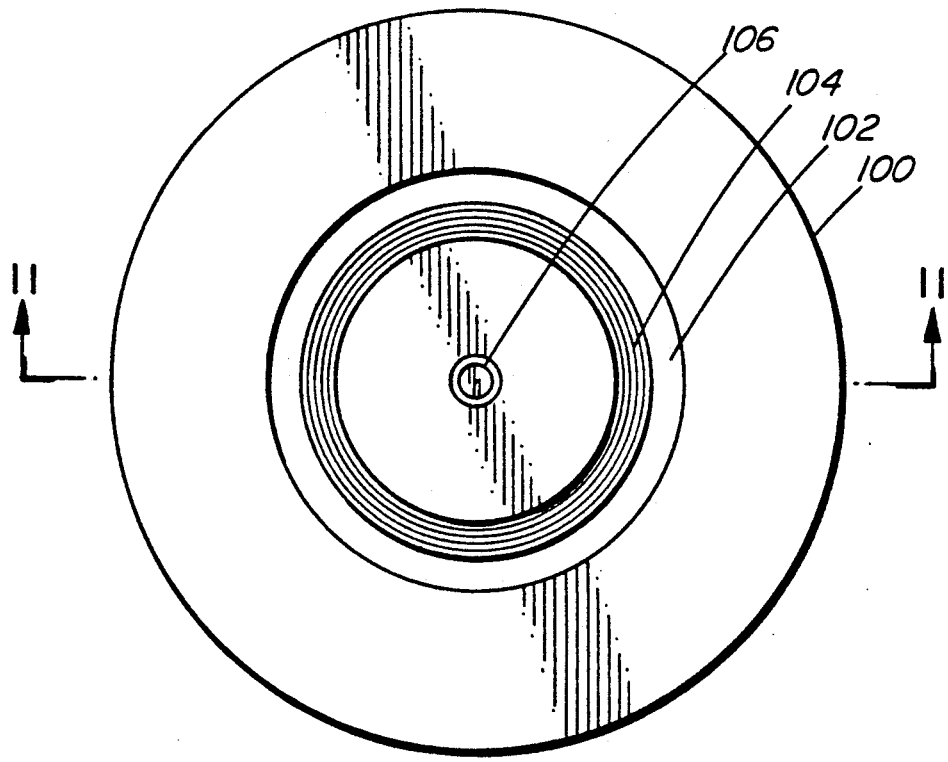
FIG. 10 is a plan view of a single levitating magnet in a system incorporating the present invention.
Figure 11:
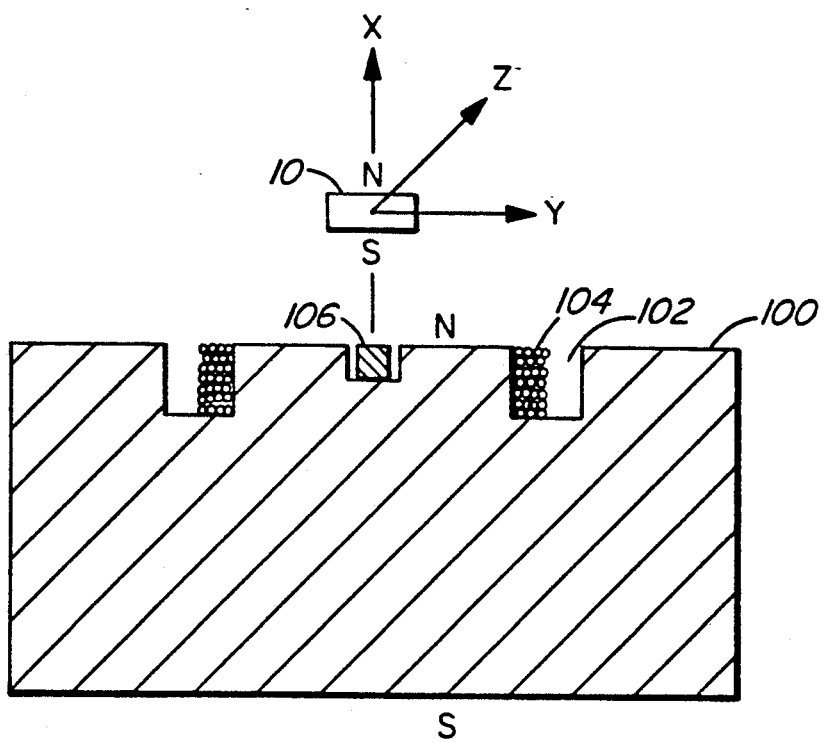
FIG. 11 is an enlarged cross section through the magnet of FIG. 10 showing a magnetic element levitated thereabove.
Figure 12:
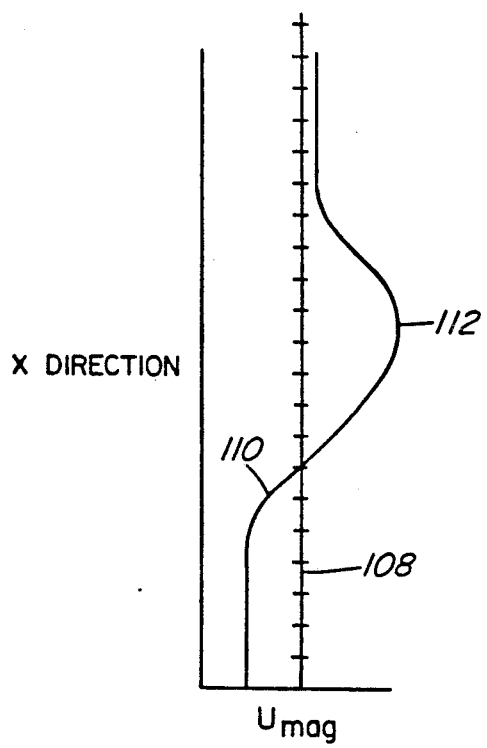
FIG. 12 is a curve of magnetic potential energy $U_{mag}$ versus distance from the face of the magnet showing an ordinary magnet and a magnet provided with an annular groove as illustrated in FIGS. 10 and 11.

FIGS. 10, 11 and 12 illustrate a different system utilizing a single magnetic element to stabilize the levitated element 10 in a stabilization or locating plane y,z parallel to the face of the magnet illustrated in FIG. 11 with x axis perpendicular to the y,z plane and to the face of the permanent magnet 100. The orientation of the axes, or naming of the axes as x, y or z axes has no significance, however for consistency y and z axis have been used to define a locating plane or the plane of stabilization y,z established by a permanent magnet means of the levitation device in both embodiments.

In the embodiment currently being described the permanent magnet 100 is substantially cylindrical as illustrated in FIG. 10 and is provided with an annular groove 102 concentric to the x axis and in which is received a coil 104 that forms the controllable force means, i.e. the controllable magnet that is operated to control the position of the element 10 in the x direction. Also positioned within the magnet 100 on the axis x is a sensor 106 which senses the position of the element 10 relative to the face of the magnet, i.e. the spacing in the x direction. The sensor 106 may be any suitable sensor such as a Hall sensor and functions to provide a signal as described above with respect to the sensor 32.

The position and size of the annular groove 100 is a key feature in forming the levitation system illustrated in FIGS. 10, 11 and 12. A graph magnetic potential energy $U_{mag}$ versus distance in the x direction is shown in FIG. 12. The hash line 108 indicates the typical magnetic effect generated by the magnet 100 when no groove 102 is provided. The curve 110 illustrates the changed magnetic potential energy when groove 102 is provided. It will be noted that the magnetic potential energy when the groove 102 is provided reaches a maximum at the point 112, at a distance from the surface of the magnet 100 determined by the strength of the magnetic 100 and the size and position of the groove 102. This point of maximum magnetic potential energy 112 indicates that the magnetic potential energy decreases on opposite sides of the point 112 so that the element 10 positioned at this point is unstable in the x direction, however in both the y and z directions, i.e. in the y,z plane the magnetic potential energy must increase in substantially all directions of displacement so there is stability in the y,z plane. However, as above indicated, stability in the x direction, i.e. perpendicular to the y,z plane, is not provided by the main magnet 100.

To obtain stability in the x direction, the sensor 106 senses the position of the element 10 and a feed back controller such as the controller 30 is suitably programmed to adjust the current in the coil 104 to hold the element 10 in stable position, i.e. at a fixed distance from the magnet 100 measured in the x direction.

In the FIG.-5 embodiment the stability plane y,x is substantially parallel to a straight line (z axis) between center of the static magnetic means (magnets 14, 16, 18 and 20) and the center of the magnetic region 13 of the levitated element 10, while in the FIGS. 10 and 11 embodiment the stabilizing plane y,z is perpendicular to the straight line (z axis) connecting the center of the static magnet means 100 with the center magnetic region 13 of the levitated element 10.

Figure 13:
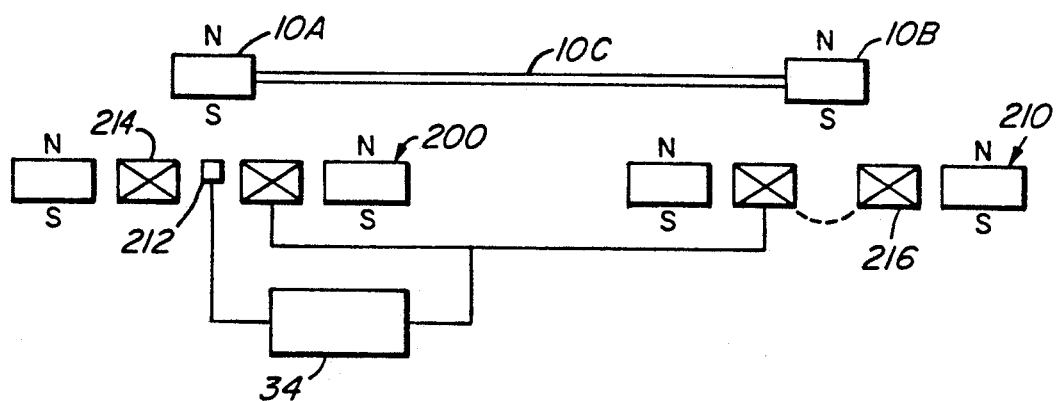
FIG. 13 shows a further embodiment of the present invention levitating a pair of rigidly coupled levitated elements.

The above examples have all used a levitated element which has been shown as having a single magnetic element. It is also possible to utilize the present invention as shown in FIG. 13 to support two rigidly interconnected elements 10A and 10B, interconnected for example by a bar or the like 11, in levitated position relative to a levitation device by providing a magnetic arrangement for each discrete magnetic element 10A or 10B, i.e. the magnetic devices 200 and 210 shown in FIG. 9. In the arrangement illustrated a sensor 212 senses the position of one of the levitated magnetic elements, in this case, the magnetic element 10A, controls the controller 34 to adjust suitable coils 214 to stabilize the magnetic element 10A and a similar coil 216 to stabilize the element 10B from movement.

It will be apparent that in some cases it may be satisfactory to eliminate one of the coils 214 or 216.

The above specific examples do not depend on gravity, and, it will be apparent that if the element 10 is subject to different gravitational or other external forces that are not too great, the element 10 will simply be positioned slightly differently relative to the levitation means. It will also be evident that the levitation and orientation of the levitated element 10 will be influenced by the mass distribution of the whole entity being levitated.

As mentioned earlier, the stability plane need not necessarily be horizontal or vertical, nor parallel or perpendicular to the line between the center of the static magnetic means and the center of the levitated element. While Hall effect sensors have been described hereinabove, other sensor means may be used, for example, detectors employing reflected light or ultrasonic sound waves, capacitive sensors using electrostatic effects or as another example, detection of the force created by the field from the levitated element acting on the static magnetic means.

Similarly the controllable force means to maintain the element in the stability plane, i.e. the y,z plane, has been disclosed as controllable magnetic means but presumably they could also include means employing controlled forced air, electrostatic forces, magnetic forces from a variable magnet or magnetic forces controlled by small controlled displacement of the static magnetic means (effective inertial forces) as well as other satisfactory non-contacting force applying means.

Having described the invention, modifications will be evident to those skilled in the art without departing from the spirit of the invention as defined in the appended claims.

I claim:

1. A levitating system comprising a levitating device positioned on one side of a separating plane for maintaining a levitated element at a substantially stable position on the side of said separating plane remote from said one side and wherein said levitated element includes magnetic means defining a magnetic region, and said levitating device comprises a static magnetic means producing a preselected static magnetic field configuration such that said levitated element is levitated by said magnetic field configuration interacting with said magnetic region to cause magnetic potential energy of said interaction to increase for substantially all displacements of said levitated element from said stable position in directions parallel to a preselected stability plane and said magnetic potential energy to decrease for any displacement of said levitated element from said stable position in a direction perpendicular to said stability plane, a sensor means generating a signal dependent on displacement of said levitated element in said direction perpendicular to said stability plane, a non contacting controllable force means and a feedback control means, said feedback control means receiving said signal from said sensor means and controlling said controllable force means to stabilize said levitated element against displacement from said stable position in said direction perpendicular to said stability plane.

2. A levitating system as defined in claim 1 wherein said static magnetic means comprises a first magnetic means which stabilizes said levitated element against displacement from said stable position parallel to a first direction within said stability plane and a second magnetic means which stabilizes said levitated element against displacements parallel to a second direction within said stability plane and wherein said second direction is substantially perpendicular to said first direction.

3. A levitating system as defined in claim 1 wherein said magnetic means forming said magnetic region is formed by at least one magnet having a polarization substantially parallel to a preselected magnetic direction and wherein said magnetic region has a maximum dimension which is significantly less than the minimum distance between said at least one magnet and said static magnetic means.

4. A levitating system as defined in claim 1 wherein said stability plane is substantially parallel to a straight line between the center of said static magnetic means and the center of said magnetic region.

5. A levitating system as defined in claim 3 wherein said static magnetic means comprises a first magnetic means which stabilizes said levitated element against displacement from said stable position parallel to a first direction within said stability plane and a second magnetic means which stabilizes said levitated element against displacements parallel to a second direction within said stability plane and wherein said second direction is substantially perpendicular to said first direction.

6. A levitating system as defined in claim 4 wherein said static magnetic means comprises a first magnetic means which stabilizes said levitated element against displacement from said stable position parallel to a first direction within said stability plane and a second magnetic means which stabilizes said levitated element against displacements parallel to a second direction within said stability plane and wherein said second direction is substantially perpendicular to said first direction.

7. A levitating system as defined in claim 4 wherein said magnetic means forming said magnetic region is formed by at least one magnet having a polarization substantially parallel to a preselected magnetic direction and wherein said magnetic region has a maximum dimension which is significantly less than the minimum distance between said at least one magnet and said static magnetic means.

8. A levitating system as defined in claim 5 wherein said stability plane is substantially parallel to a straight line between the center of said static magnetic means and the center of said magnetic region.

9. A levitating system as defined in claim 2 wherein said first magnetic means comprises a pair of spaced bar magnets with their poles facing in a direction parallel to a straight line from the center of said pair of magnets to the center of said magnetic region of said levitated element and wherein said first magnetic means and said magnetic element have their opposite magnetic poles adjacent to each other.

10. A levitating system as defined in claim 6 wherein said first magnetic means comprises a pair of spaced bar magnets with their poles facing in a direction parallel to a straight line from the center of said pair of magnets to the center of said magnetic region of said levitated element and wherein said first magnetic means and said magnetic element have their opposite magnetic poles adjacent to each other.

11. A levitating system as defined in claim 8 wherein said first magnetic means comprises a pair of spaced bar magnets with their poles facing in a direction parallel to a straight line from the center of said magnets to the center of said magnetic region of said levitated element and wherein said first magnetic means and said magnetic element have their opposite magnetic poles adjacent to each other.

12. A levitating system as defined in claim 2 wherein said second magnetic means comprises a second pair of spaced bar magnets with poles facing substantially in the opposite direction as said poles of said first magnetic means.

13. A levitating system as defined in claim 10 wherein said second magnetic means comprises a second pair of spaced bar magnets with poles facing substantially in the opposite direction as said poles of said first magnetic means.

14. A levitating system as defined in claim 11 wherein said second magnetic means comprises a second pair of spaced bar magnets with poles facing substantially in the opposite direction as said poles of said first magnetic means.

15. A levitating system as defined in claim 2 wherein said controllable force means comprises an electromagnet formed by two coil sections arranged with a gap therebetween, said gap being symmetrically positioned relative to said stability plane, said gap providing a leakage magnetic field, said leakage magnetic field from said gap having a polarity opposite to the polarity of the magnetic field created by said electromagnet in the region surrounding said electromagnet and wherein said leakage field and said surrounding field substantially cancel each other at said stable position.

16. A levitating system as defined in claim 4 wherein said controllable force means comprises an electromagnet formed by two coil sections arranged with a gap therebetween, said gap being symmetrically positioned relative to said stability plane, said gap providing a leakage magnetic field said leakage magnetic field from said gap having a polarity opposite to the polarity of the magnetic field created by said electromagnet in the region surrounding said electromagnet and wherein said leakage field and said surrounding field substantially cancel each other at said stable position.

17. A levitating system as defined in claim 6 wherein said controllable force means comprises an electromagnet formed by two coil sections arranged with a gap therebetween, said gap being symmetrically positioned relative to said stability plane, said gap providing a leakage magnetic field said leakage magnetic field from said gap having a polarity opposite to the polarity of the magnetic field created by said electromagnet in the region surrounding said electromagnet and wherein said leakage field and said surrounding field substantially cancel each other at said stable position.

18. A levitating system as defined in claim 7 wherein said controllable force means comprises an electromagnet formed by two coil sections arranged with a gap therebetween, said gap being symmetrically positioned relative to said stability plane, said gap providing a leakage magnetic field said leakage magnetic field from said gap having a polarity opposite to the polarity of the magnetic field created by said electromagnet in the region surrounding said electromagnet and wherein said leakage field and said surrounding field substantially cancel each other at said stable position.

19. A levitating system as defined in claim 8 wherein said controllable force means comprises an electromagnet formed by two coil sections arranged with a gap therebetween, said gap being symmetrically positioned relative to said stability plane, said gap providing a leakage magnetic field said leakage magnetic field from said gap having a polarity opposite to the polarity of the magnetic field created by said electromagnet in the region surrounding said electromagnet and wherein said leakage field and said surrounding field substantially cancel each other at said stable position.

20. A levitating system as defined in claim 9 wherein said controllable force means comprises an electromagnet formed by two coil sections arranged with a gap therebetween, said gap being symmetrically positioned relative to said stability plane, said gap providing a leakage magnetic field said leakage magnetic field from said gap having a polarity opposite to the polarity of the magnetic field created by said electromagnet in the region surrounding said electromagnet and wherein said leakage field and said surrounding field substantially cancel each other at said stable position.

21. A levitating system as defined in claim 10 wherein said controllable force means comprises an electromagnet formed by two coil sections arranged with a gap therebetween, said gap being symmetrically positioned relative to said stability plane, said gap providing a leakage magnetic field said leakage magnetic field from said gap having a polarity opposite to the polarity of the magnetic field created by said electromagnet in the region surrounding said electromagnet and wherein said leakage field and said surrounding field substantially cancel each other at said stable position.

22. A levitating system as defined in claim 11 wherein said controllable force means comprises an electromagnet formed by two coil sections arranged with a gap therebetween, said gap being symmetrically positioned relative to said stability plane, said gap providing a leakage magnetic field said leakage magnetic field from said gap having a polarity opposite to the polarity of the magnetic field created by said electromagnet in the region surrounding said electromagnet and wherein said leakage field and said surrounding field substantially cancel each other at said stable position.

23. A levitating system as defined in claim 12 wherein said controllable force means comprises an electromagnet formed by two coil sections arranged with a gap therebetween, said gap being symmetrically positioned relative to said stability plane, said gap providing a leakage magnetic field said leakage magnetic field from said gap having a polarity opposite to the polarity of the magnetic field created by said electromagnet in the region surrounding said electromagnet and wherein said leakage field and said surrounding field substantially cancel each other at said stable position.

24. A levitating system as defined in claim 13 wherein said controllable force means comprises an electromagnet formed by two coil sections arranged with a gap therebetween, said gap being symmetrically positioned relative to said stability plane, said gap providing a leakage magnetic field said leakage magnetic field from said gap having a polarity opposite to the polarity of the magnetic field created by said electromagnet in the region surrounding said electromagnet and wherein said leakage field and said surrounding field substantially cancel each other at said stable position.

25. A levitating system as defined in claim 14 wherein said controllable force means comprises an electromagnet formed by two coil sections arranged with a gap therebetween, said gap being symmetrically positioned relative to said stability plane, said gap providing a leakage magnetic field, said leakage magnetic field from said gap having a polarity opposite to the polarity of the magnetic field created by said electromagnet in the region surrounding said electromagnet and wherein said leakage field and said surrounding field substantially cancel each other at said stable position.

26. A levitating system as defined in claim in claim 1 wherein said static magnetic means comprises a main magnet having an annular groove formed in a face thereof facing said levitated element and wherein said main magnet and said magnetic means of said levitated element have their opposite magnetic poles adjacent to each other.

27. A levitating system as defined in claim in claim 3 wherein said static magnetic means comprises a main magnet having an annular groove formed in a face thereof facing said levitated element and wherein said main magnet and said magnetic means of said levitated element have their opposite magnetic poles adjacent to each other.

28. A levitating system as defined in claim 26 wherein said controllable force means comprises an electromagnet substantially positioned in and extending around said annular groove.

29. A levitating system as defined in claim 27 wherein said controllable force means comprises an electromagnet substantially positioned in and extending around said annular groove.

* * * * *

UNITED STATES PATENT AND TRADEMARK OFFICE
CERTIFICATE OF CORRECTION

| | | |
|---|---|---|
| PATENT NO. | : 5,168,183 | Page 1 of 1 |
| APPLICATION NO. | : 07/676066 | |
| DATED | : December 1, 1992 | |
| INVENTOR(S) | : Lorne A.R. Whitehead | |

It is certified that error appears in the above-identified patent and that said Letters Patent is hereby corrected as shown below:

Column 12, line 18 claim 1, insert the following:

said static magnet means including fixed magnets arranged at a particular spacing relative to one another in order to generate said magnetic configuration with said magnetic means in the levitated element Signed and Sealed this Third Day of June, 2008

JON W. DUDAS
*Director of the United States Patent and Trademark Office*